United States Patent [19]

Scott

[11] Patent Number: 4,854,657

[45] Date of Patent: Aug. 8, 1989

[54] KALEIDOSCOPE WITH RESTRICTIVE APERTURE FOR VISUAL ENHANCEMENT

[76] Inventor: Brent Scott, 170 Highland Trail, Crest, Calif. 92021

[21] Appl. No.: 177,924

[22] Filed: Apr. 5, 1988

[51] Int. Cl.⁴ .............................................. G02B 23/00
[52] U.S. Cl. .................................................... 350/4.2
[58] Field of Search ..................... 350/4.1, 4.2; 353/1, 353/2

[56] References Cited

U.S. PATENT DOCUMENTS 4,061,414 12/1977 Price ...................................... 350/4.1
4,231,634 11/1980 Gantz et al. .......................... 350/4.2
4,793,671 12/1988 Palochak et al. .................... 350/4.1

Primary Examiner—Richard A. Wintercorn
Attorney, Agent, or Firm—Frank D. Gilliam

[57] ABSTRACT

A mask positioned over the light receiving end of a conventional kaleidoscope to alter the light pattern entering the kaleidoscope. The mask may be designed to present various patterns of light into the kaleidoscope for different visual effects when viewing the kaleidoscope. The mask can be fixedly or rotatably attached to the light receiving end of the kaleidoscope during manufacture, or the like, or can be added as an after market accessory in a like fashion.

7 Claims, 1 Drawing Sheet

KALEIDOSCOPE WITH RESTRICTIVE APERTURE FOR VISUAL ENHANCEMENT

BACKGROUND OF THE INVENTION

Kaleidoscopes have been in existence for hundreds of years and are well known by the general public. This invention is directed to a modification to the conventional kaleidoscope which enhances the viewing pleasure derived therefrom.

Kaleidoscopes since their inception have consisted generally of longitudinally positioned mirrors and bits and pieces of colorful generally translucent objects confined by plain glass at the viewer adjacent end and translucent or opaque or otherwise uniformally restricted light transfer lens at the opposite or light receiving end. In operation the entire kaleidoscope is rotated or the end having the bits and pieces rotated relative to the mirrors and portion adjacent the eye of the viewer. The rotation of the bits and pieces causes them to be continually joggled about presenting continual changing pleasurable patterns and color to the viewer. The background light visible to the viewer is always maintained at a uniform intensity due to the fact that the restricted light transfer lens is uniform in light transfer across its entire surface. It would be a further enhancement to viewing pleasure if the background light intensity over selected areas of the restricted light transfer lens could be varied.

SUMMARY OF THE INVENTION

The invention is directed to an alteration to the presently well known kaleidoscope to enhance the viewing pleasure of the viewer thereof. The invention is specifically directed to selectively controlling the light received by the restrictive light receiving lens of the kaleidoscope remote from the eye of the viewer. The lens is partly covered with a light impervious mask with a selected light receiving opening therethrough which allows light to the restrictive light receiving lens according to the pattern or design of the light receiving opening. The mask with the opening therethrough can be permanently affixed to the restrictive lens or can be rotatably affixed thereto. The mask can be in the form of a sleeve which can be slid over existing kaleidoscopes to add the invention improvement thereto. The selected light receiving opening of the mask can take many different forms as can be imagined. The preferred embodiments are shown and include an elongated slit, a star, a circle and crescent spaced intermediate the edge and center of the restrictive light receiving lens, these designs can also be positioned off center from the center of the restrictive light receiving lens.

In operation, as the bits and pieces of the kaleidoscope are rotated thereby changing their relative positions therewithin they receive light in different patterns which further enhances the viewing pleasure normally expected from any given kaleidoscope.

An object of this invention is to produce an improved kaleidoscope with enhanced visual sensations. Another object of this invention is to provide a mask to fit over the light receiving end of a kaleidoscope which restricts the light normally entering the kaleidoscope in selected areas.

Still another object of the invention is to allow light to enter a conventional kaleidoscope only at selected surface areas of the light receiving lens.

Other objects, advantages and novel features will be apparent from the following detailed description when read in conjunction with the appended claims and attached drawing figures.

BRIEF DESCRIPTION OF THE DRAWING FIGURES

DESCRIPTION OF THE PREFERRED EMBODIMENTS

Figure 1:
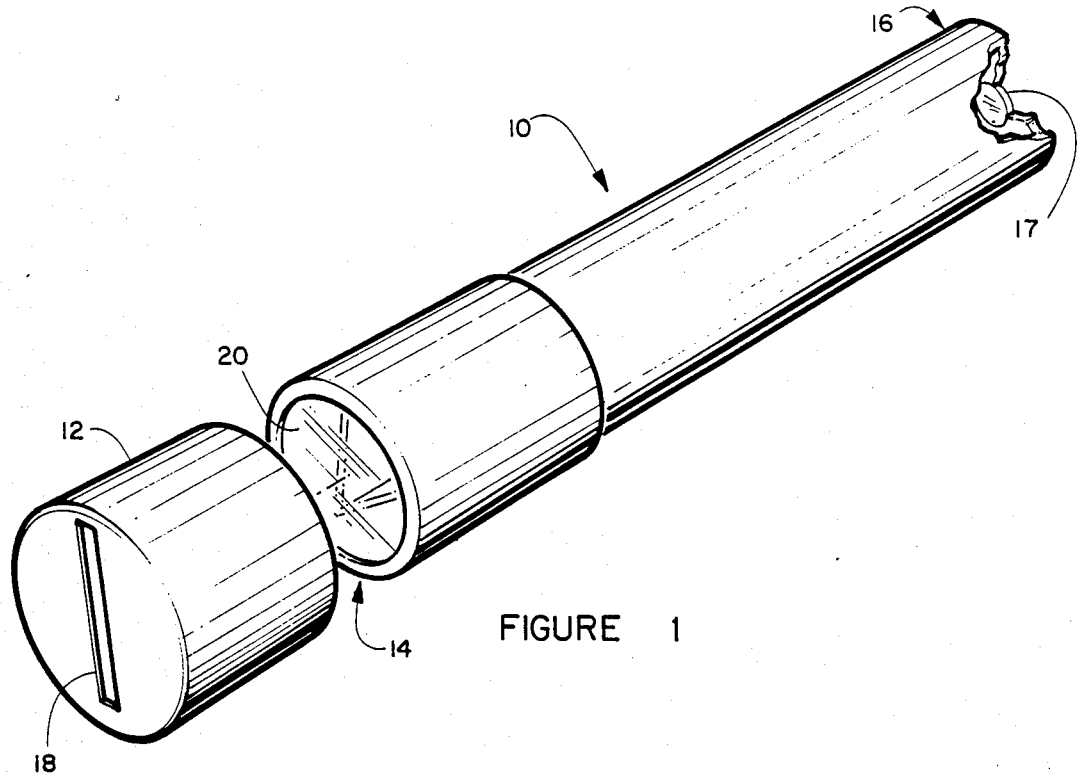
FIG. 1 is a perspective showing of a conventional kaleidoscope with a tubular slip-on removable cover over the light receiving thereof with forming a mask with a selectively designed light receiving opening therethrough.

Referring now to the various drawing Figures and specifically to drawing FIG. 1 which depicts a perspective showing of a conventional and well known kaleidoscope 10 with a mask 12 over laying the translucent light receiving end 14 of the kaleidoscope. The opposite viewing end 16 remains conventional and may include a clear lens 17.

As can be seen in the various drawing Figures, a specifically configured opening 18 through the mask surface provides the only light received by the translucent lens 20 of the kaleidoscope for internal illumination.

In the FIG. 1 showing the opening 18 is in the shape of a narrow slit which extends across the entire translucent lens 20.

Figure 2:
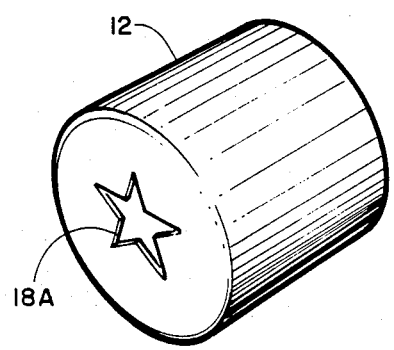
FIG. 2 is a second embodiment of the light receiving opening through the mask of FIG. 1.

In the FIG. 2 showing the opening 18A is in the form of a star centered on the translucent lens 20.

Figure 3:
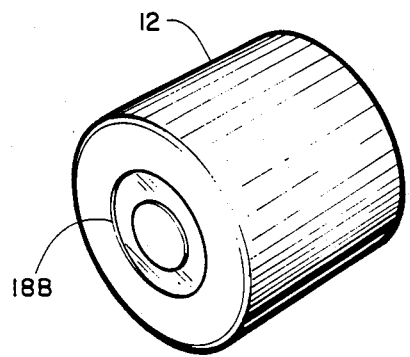
FIG. 3 is a third embodiment of the light receiving opening through the mask of FIG. 1.

In the FIG. 3 showing the opening 18B is in the form of a circular opening centered on the translucent lens 20.

Figure 4:
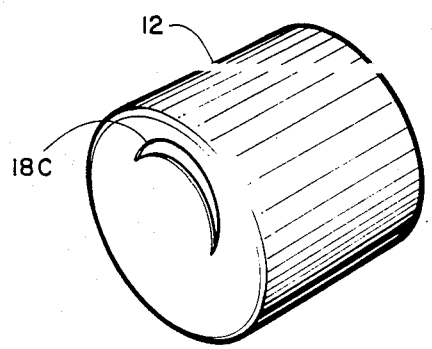
FIG. 4 is a fourth embodiment of the light receiving opening through the mask of FIG. 1.

In the FIG. 4 showing opening 18C is in the form of a crescent and is positioned off the center of the translucent lens.

It should be understood that although only a few preferred configured opening through the mask 12 are shown and described herein the opening can take any shape and be located anywhere on the surface of the light receiving end of the kaleidoscope to successfully precise this invention.

While there have been shown and described what are considered to be preferred embodiments of the present invention, it will be obvious to those of ordinary skill in the art that various changes and modifications may be made therein without departing from the spirit of the invention as defined in the appended claims.

What is claimed is:

1. Visual enhancement for a kaleidoscope comprising in combination:

a kaleidoscope having a tubular base portion housing the conventional bits and pieces of colored objects of a conventional kaleidoscope, said housing having a translucent otherwise light restrictive lens at a first end and a viewing port at the opposite second end and a rotatable overlay positioned over said first end for restricting the reception of light into said first end, said overlay having a selective configured opening therethrough, said opening positionable relative to said first end to admit light into said first end therethrough according to the configuration and position of said opening in said overlay.

2. The invention as defined in claim 1 wherein said overlay is in the form of a sleeve which fits over the first end of a conventional kaleidoscope.

3. The invention as defined in claim 1 wherein said opening through said overlay is in the form of an elongated slit that extends across said first end.

4. The invention as described in claim 1 wherein said opening through said first end is in the form of a star and is centered on said first end.

5. The invention as defined in claim 1 wherein said opening through said first end is in the form of a circular slit centered on said first end.

6. The invention as defined in claim 1 wherein said opening through said first end is positioned off center on said first end.

7. The invention as defined in claim 1 wherein said opening through said first end is in the form of a crescent and is positioned off center thereon.

* * * * *